INVENTORS
HOWARD C. LATOURNEAU
WILLIAM E. RIEDNER
BY
Lewis J. Lamm
ATTORNEY

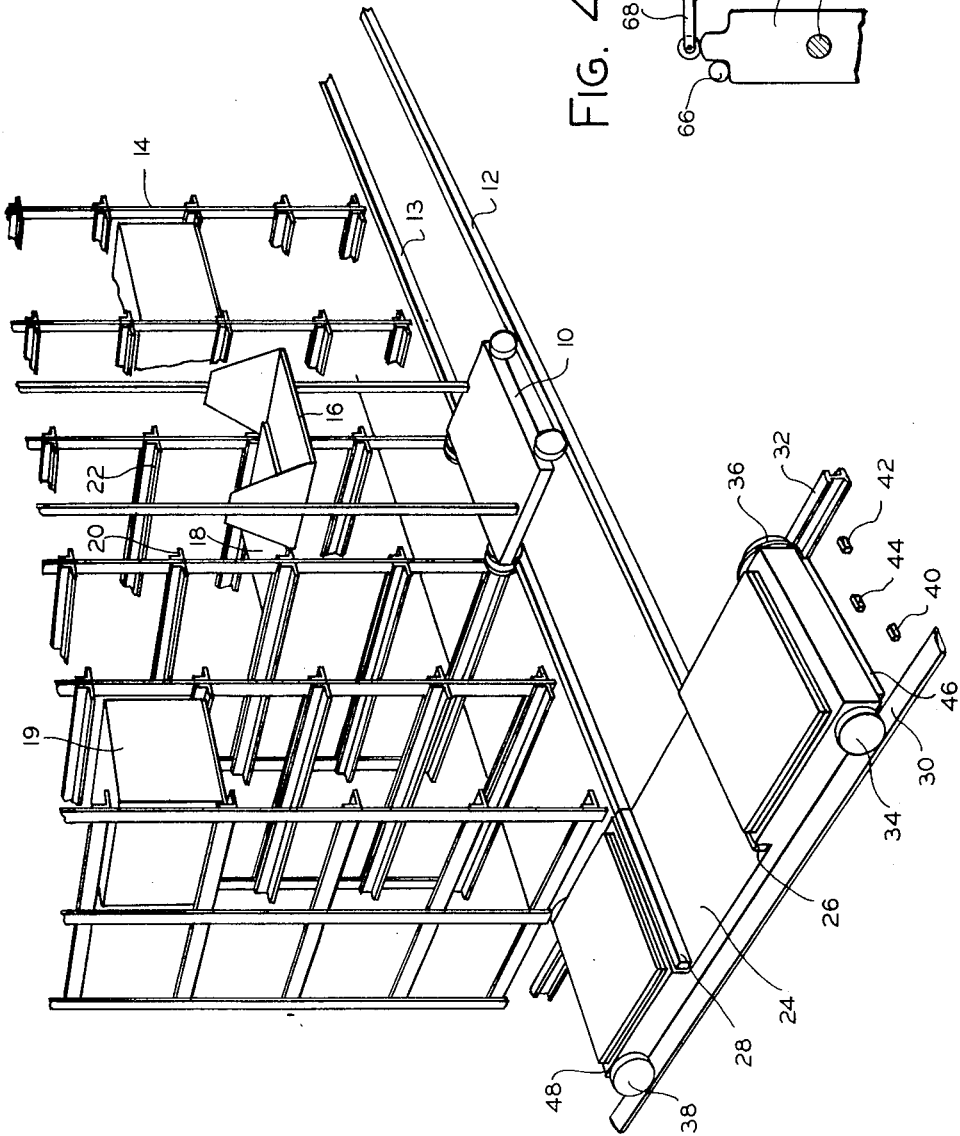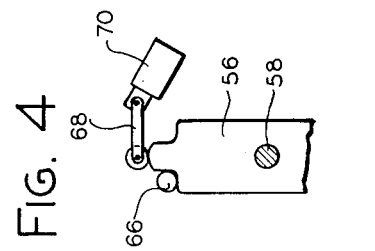

United States Patent Office 3,718,097
Patented Feb. 27, 1973

3,718,097
AUTOMATIC VEHICLE STOP MECHANISM
Howard C. La Tourneau, Augusta, and William E. Riedner, Battle Creek, Mich., assignors to Clark Equipment Company
Filed June 30, 1971, Ser. No. 158,432
Int. Cl. B61k 7/02; B65g 1/06
U.S. Cl. 104—249                    11 Claims

ABSTRACT OF THE DISCLOSURE

This is a mechanism for automatically stopping a fixed path electric motor driven vehicle by first de-energizing the electric motor and then bringing the vehicle to a positive stop. Protruding stop members are placed in the path of the vehicle to actuate both the motor de-energizing switch and to engage the positive stop means.

CROSS REFERENCE TO RELATED PATENTS

Reference is made to U.S. Pat. No. 3,536,209, Burch et al., which patent discloses a complete automatic warehousing system to which the present invention is applicable and one in which the present invention offers an improvement in the method of stopping the transfer cart at a predetermined aisle. It will become apparent as the description proceeds that the present invention is also applicable to other electrically driven fixed path vehicle systems.

BACKGROUND OF THE INVENTION

Previously in the art to which the present invention pertains, various mechanisms have been used for stopping fixed path vehicles without excessive deceleration forces. Some of these mechanisms employ switches for de-energizing the driving motor and allowing the vehicle to coast to a stop. Other devices employ complex shock absorber mechanisms which have sufficient deceleration capabilities to permit the vehicle being inadvertently driven into the stop mechanism with full power on without damage to the vehicle. Still other stop mechanisms are merely solid arresting blocks. These prior mechanisms are either expensive or do not provide sufficient deceleration force distribution to permit the stopping of a high mass vehicle without excessive mechanical stresses.

SUMMARY OF THE INVENTION

The present invention is particularly applicable to vehicles having high inherent deceleration forces particularly electrically driven through a positive gear train.

This device is particularly useful in automatic storage systems having fixed path mobile equipment, for example stackers, which travel down aisles and have transfer cars for transporting the stacker from aisle to aisle. In one particular embodiment of the present invention, the vehicle travels along rails in a fixed path. Two sets of actuating lever arms are mounted on the vehicle, one set to actuate the switch mechanism and the second set to provide a resilient positive stop for the vehicle. Mounted in the path of the vehicle are two sets of protuberances or stops. One set of these stops is so located as to engage a switch actuating lever arm and the other set of stops is located a distance from the first set equal to the approximate coast distance of the vehicle under normal speed of operation.

As the vehicle travels along the fixed path the first stop mechanism actuates a switch de-energizing the driving motor, and the vehicle then goes into a fast deceleration coast cycle, at the end of which the positive stop mechanism is engaged. The positive stop mechanism has a resilient member to prevent damage to the heavy structure by deceleration forces as it is stopped. The lever arms engaging the floor stops are manually rotatable to permit the vehicle to bypass stops at the option of the operator.

It is an important object of the present invention to simplify and make less costly, without sacrifice to function or efficiency, an apparatus for stopping a vehicle traveling along a fixed path.

It is another object of the present invention to provide means for de-energizing the motive power of a vehicle traveling along a fixed path, and thereafter provide resilient positive stopping means for the vehicle.

It is another object of the present invention to provide a low cost stopping mechanism for an electrically driven vehicle traveling on a fixed path.

Other objects and advantages of the present invention will become apparent from reading the detailed description in the specification and the independent claims.

BRIEF DESCRIPTION OF THE DRAWING

FIG. 1 is an isometric drawing of a storage system in which the present invention may be used;

FIGS. 3 and 4 show the stop engaging switch operating lever arm;

Referring now more particularly to the drawing, FIG. 1 shows the material unit stacker 10 mounted on rails 12 and 13 for fixed path longitudinal movement in the aisle adjacent to the bin structure 14. The stacker 10 has mounted thereon for vertical movement an elevator 16 which has a laterally movable platform 18 capable of elevating and depositing pallets of material 19 on the ledges 20 and 22 of the bin structure.

Figure 2:
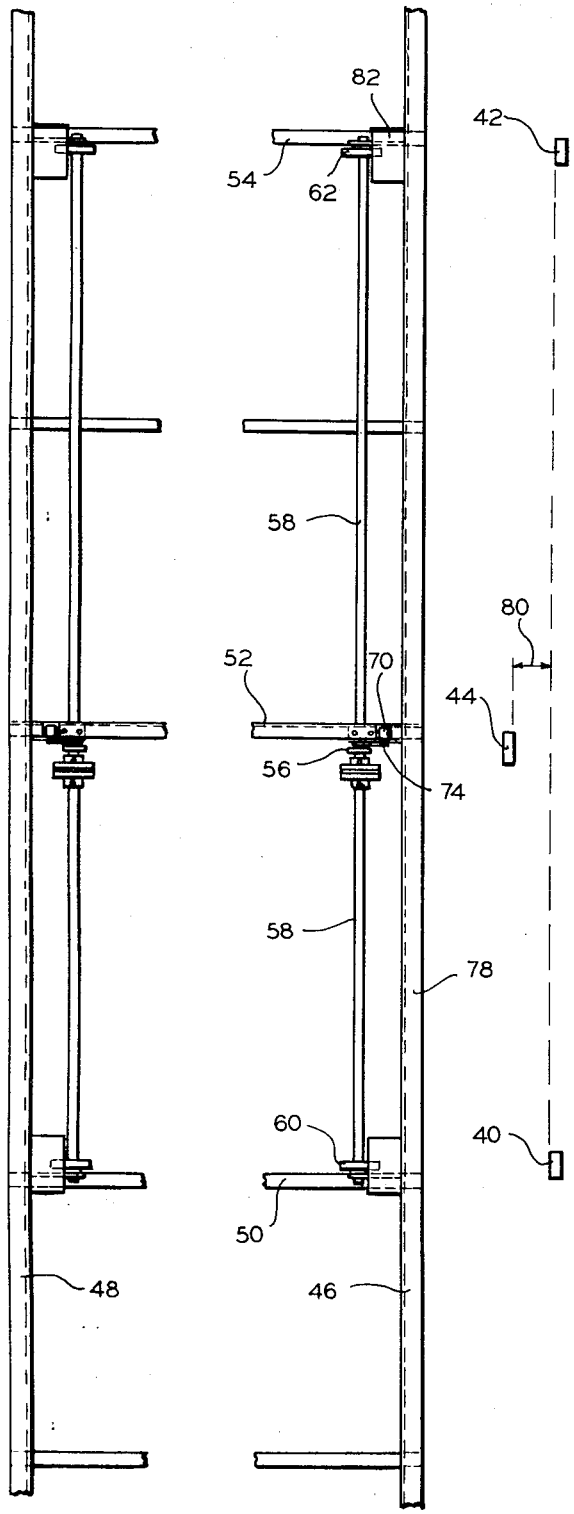
FIG. 2 shows the plan view of the base of the vehicle and the location of the floor stops.

The stacker 10 is capable of being transported between aisles by the transfer car 24. The stacker 10 is supported on the transfer car 24 by rails 26 and 28 which are shown aligned with rails 12 and 13. The transfer car travels in a fixed path transverse to the aisles on rails 30 and 32. The transfer car may be driven by one or more of the wheels 34, 36 and 38 which travel on the rails or by an independent wheel having a traction relationship with the surface over which the transfer car or vehicle 24 travels. Mounted in the floor are positive stop members 40 and 42 and the electrical stop member 44. Mounted on opposite ends of the vehicle 24 are the assemblies 46 and 48 which cooperate with the stop members to de-energize the electrical drive motors and thereafter positive stop the vehicle.

Referring now to FIG. 2 the assembly 46 and the cooperating stop members 40, 42 and 44 are shown in more detail. The assembly 46 has cross members 50, 52 and 54 transverse to which is mounted a shaft 58 which carries rotatable arms which engage the stops 40, 42 and 44. The shaft 58 is freely rotatable with respect to the cross members 50, 52 and 54. The arms 60 and 62 are rigidly fixed to the shaft 58 while the arm 56 is freely rotatable on the shaft 58.

Figure 3:
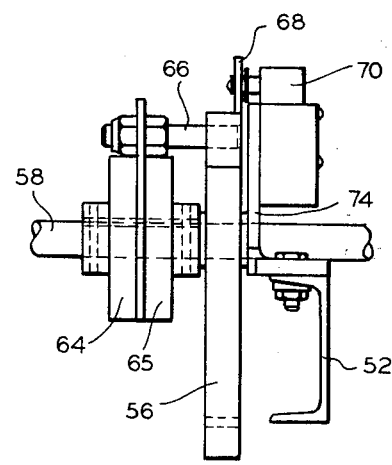

Referring now to FIGS. 3 and 4, the switch actuating assembly is shown in greater detail. In these figures the arm 56 is again shown as being freely rotatable on the shaft 58. The collars 64 and 65 are pinned to the shaft and carry thereon a crank pin 66.

The arm 56 may be raised manually by the operator to engage pin 66 and thereby rotate the shaft 58 to move the arms 60 and 62 into a horizontal position where they will not engage the stops 40 and 42 respectively and operating switch 70 through arm 68 removing power from the drive motor. When the arm 56 is manually raised in this position, it, of course, does not engage the stop 44 and the vehicle may by actuating manual actuated switches in the control power travel beyond the stops.

When the arm 56 is left in this normal down position, it engages the stop 44 thereby causing the other end of arm 56 or 68 of the switch 70, thus de-energizing the driving motor. Also when the arm 56 is left in this normal downward position, the arms 60 and 62 engage the stops 40 and 42 respectively to provide a positive stop of the vehicle.

Figure 5:
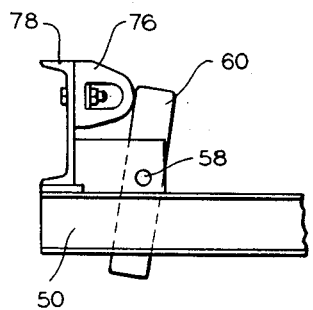
FIG. 5 shows the lever arm assembly which engages the positive stops.

Referring to FIG. 5, this positive stop is shown in more detail. Referring to this figure the shaft 58 is rotatably carried by the cross member 50 and the arm 60 is rigidly attached to the rotatable shaft 58. A resilient stopping member 76 is rigidly attached to the beam 78 which is in turn attached to the member 50.

Operation

The operation of the preferred embodiment of the present invention is as follows. Referring to FIG. 1 the vehicle 24 used for transferring the stacker 10 from aisle to aisle is assumed to be traveling to the right toward the stops 40, 42 and 44. Referring to FIGS. 2 through 5, the assembly 46 is moving to the right. The positive stops 40 and 42 are in alignment in the direction normal to the direction of travel of the vehicle and are spaced a distance 80 from the electrical switch actuating stop 44 in the direction of travel of the vehicle. This distance 80 is approximately the coast distance of the vehicle at the normal operating speed. When the vehicle travels to the position where the arm 56 pivoted on the shaft 58 engages the stop or projection in the floor 44, the arm 56 rotates to engage the arm 68 and actuate the switch 70 de-energizing the motor. As soon as the motor is de-energized the vehicle goes into a decelerating coast cycle. The coast distance of the vehicle, when operating at its normal operating speed, is approximately the distance 80 between the floor projections or stops 44 and 40. As the vehicle coasts to near zero velocity, the arm 60 engages the stop 40 simultaneously with the similar arm 62 engaging the stop 42. The arm 60 rotates about the shaft 58, engaging the resilient stop 76 which is supported by the member 78. The mating arm 62 engages a similar resilient stop 82 and brings the vehicle to a smooth positive stop.

If the operator desires to bypass these stops, the lower end of the arm 56 is manually raised with the upper end of this arm engaging the pin 66 and operating switch 70 through arm 68. The pin 66 through the collars 64 and 65 rotates the shaft 58 so as to rotate the arms 60 and 62 into horizontal position so that arm 56 does not engage stop 44 and arm 60 does not engage stop 40 nor does arm 62 engage stop 42. The vehicle then may proceed over the stops 40, 42 and 44 by operating control switches that override the action of switch 70. The arms on the trailing edge of the vehicle mounted to the assembly 48 rotate out of the way as they pass over the stops 44 and 42, and therefore, as long as the operator maintains the arms 56, 60 and 62 in the horizontal position, the vehicle will continue to travel in its fixed path.

The arms similarly associated with the assembly 48 operate in the manner described above when the vehicle is traveling in the opposite direction.

We have described the preferred embodiment of the present invention, together with its operation.

It will, of course, be understood that various changes may be made in the forms, details, arrangements, proportions and operation of the parts of this invention without departing from the scope thereof, which consists of the matter shown and described herein and particularly set forth in the appended claims.

We claim:
1. A vehicle stopping mechanism comprising;
a stationary surface,
a vehicle movable in a fixed path over said surface,
an electric motor capable of propelling said vehicle over said surface,
switch mechanism mounted on said vehicle capable of de-energizing said motor,
a first pivotal arm mounted on said vehicle capable of operating said switching mechanism to de-energize said motor,
a shock absorbing member mounted on said vehicle,
a second pivotal arm mounted on said vehicle capable of engaging said shock absorbing member,
a first stop member mounted on said stationary surface capable of engaging said first pivotal arm to operate said switch mechanism to de-energize said motor when said vehicle passes over said stop member,
a second stop member mounted on said stationary surface capable of engaging said second pivotal arm and causing said second pivotal arm to rotate into engagement with said shock absorbing member,
whereby said first stop member first engages said first rotatable arm to operate said switch mechanism to de-energize said motor and thereafter said second stop member engages said second pivotal arm to rotate said last mentioned arm into engagement with said shock absorbing member to thereby stop further movement of said vehicle.

2. A vehicle stopping mechanism as claimed in claim 1 including;
at least two second stop members mounted on said vehicle,
at least two second stop members mounted on said hicle capable of engaging said shock absorbing members respectively,
at leaset two second stop members mounted on said stationary surface capable of engaging said second pivotal arms respectively and causing said second pivotal arms to rotate into engagement with said shock absorbing members respectively,
whereby said second stop members simultaneously engage said second pivotal arms to rotate said last mentioned arms into engagement with said shock absorbing members to thereby stop further movement of said vehicle.

3. A vehicle stopping mechanism as claimed in claim 1 in which;
both of said pivotal arms may be rotated to a position in which they will not engage said stop members mounted on said stationary surface,
whereby said vehicle stopping mechanism is made ineffective to stop said vehicle.

4. A vehicle stopping mechanism as claimed in claim 1 in which;
the vehicle is an automatic storage system transfer cart.

5. A vehicle stopping mechanism as claimed in claim 1 in which;
said second stop member is located approximately the coast distance of the vehicle at its normal operating velocity from said first stop member in the direction of travel of said vehicle.

6. A vehicle stopping mechanism as claimed in claim 1 in which;
said first and said second pivotal arms are rotatable about a common axis.

7. A vehicle stopping mechanism as claimed in claim 2 in which;
one of said second pivotal arms is mounted on one side of the center of mass of said vehicle, and
at least one other of said second pivotal arms is mounted on the opposite side of the center of mass of said vehicle.

8. A vehicle stopping mechanism as claimed in claim 2 in which;
said second stop member is located approximately the coast distance of the vehicle at its normal operating velocity from said first stop member in the direction of travel of said vehicle.

9. A vehicle stopping mechanism as claimed in claim 2 in which;
said first and said second pivotal arms are rotatable about a common axis.

10. A vehicle stopping mechanism as claimed in claim 4 in which;
said second stop member is so located as to positively stop said transfer cart at approximately the coast distance of said transfer cart after said drive motor is de-energized.

11. A vehicle stopping mechanism as claimed in claim 6 in which;
said first and said second pivotal arms are mounted on a common shaft.

References Cited

UNITED STATES PATENTS

| | | | |
|---|---|---|---|
| 1,675,165 | 6/1928 | Custer | 104—149 |
| 2,129,539 | 9/1938 | Steenstrup | 104—249 |
| 3,403,793 | 10/1968 | Armington | 214—16.4 A |
| 3,474,877 | 10/1969 | Wesener | 180—98 |
| 3,602,379 | 8/1971 | Bosse | 214—16.4 B |
| 3,610,372 | 10/1971 | Warren | 104—249 |

DRAYTON E. HOFFMAN, Primary Examiner

U.S. Cl. X.R.

104—147, 149; 214—16.4 B